(12) United States Patent
Bares et al.

(10) Patent No.: US 8,714,310 B2
(45) Date of Patent: May 6, 2014

(54) AXLE COOLING USING HYDRAULIC RETURN OIL

(75) Inventors: Michael Sylvester Bares, Fargo, ND (US); Jarrod Lemire, Cedar Falls, IA (US); Jeffrey Alan Roeber, West Fargo, ND (US)

(73) Assignee: CNH America LLC, New Holland, PA (US)

( * ) Notice: Subject to any disclaimer, the term of this patent is extended or adjusted under 35 U.S.C. 154(b) by 1990 days.

(21) Appl. No.: 11/843,141

(22) Filed: Aug. 22, 2007

(65) Prior Publication Data

US 2009/0050424 A1 Feb. 26, 2009

(51) Int. Cl.
 *F16H 57/04* (2010.01)

(52) U.S. Cl.
 USPC .............. 184/6.22; 184/26; 165/41; 165/297

(58) Field of Classification Search
 USPC .......... 184/6, 6.12, 6.19, 6.22, 6.28, 26, 27.1, 184/27.2; 123/196; 165/287, 296, 297, 41, 165/47, 53, 56–57
 See application file for complete search history.

(56) References Cited

U.S. PATENT DOCUMENTS

| | | |
|---|---|---|
| 1,992,568 A | 2/1935 | Connor |
| 2,698,773 A | 1/1955 | Kaczor |
| 3,259,216 A | 7/1966 | Klaus et al. |
| 3,949,844 A | 4/1976 | Larson et al. |
| 4,083,469 A | 4/1978 | Schexnayder |
| 4,393,922 A | 7/1983 | Bahrle et al. |
| 4,633,938 A | 1/1987 | Schunck et al. |
| 5,931,218 A | 8/1999 | Carlson et al. |
| 5,975,257 A | 11/1999 | Roach |
| 6,186,285 B1 | 2/2001 | Parsons |
| 6,432,018 B1 | 8/2002 | Morse et al. |
| 6,474,405 B1 | 11/2002 | Bell et al. |
| 6,499,565 B1 * | 12/2002 | Coyle et al. ................. 184/6.12 |
| 6,871,726 B2 | 3/2005 | Coyle et al. |
| 6,899,074 B1 | 5/2005 | Carlsson |
| 6,907,958 B2 | 6/2005 | Coyle et al. |
| 7,028,810 B2 * | 4/2006 | Coyle et al. ................. 184/6.12 |
| 7,845,471 B2 * | 12/2010 | Bares et al. ................. 184/6.22 |
| 2003/0188937 A1 | 10/2003 | Schneider et al. |
| 2004/0149518 A1 | 8/2004 | Coyle et al. |
| 2004/0238283 A1 | 12/2004 | Coyle et al. |

FOREIGN PATENT DOCUMENTS

| | | |
|---|---|---|
| GB | 2079393 A | 7/1980 |
| JP | 403024352 A | 2/1991 |

* cited by examiner

*Primary Examiner* — Jason Bellinger
(74) *Attorney, Agent, or Firm* — Patrick M. Sheldrake

(57) ABSTRACT

A work vehicle includes a frame and an axle assembly coupled to the frame, including a first axle shaft and coil substantially disposed in an axle housing. A first wheel couples to the first axle shaft of the axle assembly. An axle lubricating fluid is disposed within the axle housing. A cooling circuit fluidly coupled to the axle assembly circulates cooling fluid therethrough. The coil conducts cooling fluid through the first axle housing separately from the lubricating fluid. A cooling fluid circuit is selectively fluidly coupled to the first coil to circulate the cooling fluid therethrough.

15 Claims, 4 Drawing Sheets

AXLE COOLING USING HYDRAULIC RETURN OIL

FIELD OF THE INVENTION

The present invention relates generally to the field of work vehicles. It relates more particularly to removal of braking heat from an axle of a wheeled loader.

BACKGROUND OF THE INVENTION

Some work vehicles, such as end loaders, must change their directions of movement frequently. To do this, wheel or live axle brakes are generally used to first bring the vehicle to a stop. When this is done frequently, the brakes become overheated.

This has sometimes been resolved by placing the brakes inside an axle housing, where the heat generated by brake friction is removed from the brake by an axle lubricating bath. The lubricant spreads the heat over the entire interior surface of the axle housing, whereupon thermal conduction through the walls of the axle housing heat the exterior surface of the axle housing and provide increased surface area for heat to be convected away by ambient air.

In some instances, however, convection to and from the axle housing surfaces is insufficient to remove braking heat rapidly enough, and the axle lubricant consequently becomes excessively hot (e.g., above 300 degrees Fahrenheit). This is injurious not only to the lubricant itself (accelerating oxidation and breakdown), but also to the bearings and seals associated with the axle shaft.

Typically, the brake is a wet multiple disk brake; "wet", because the disks rotate through a bath of lubricating oil. As the multiple brake disks rotate through the lubricating oil, braking heat is transferred from the disks to the lubricating oil.

The temperature of the lubricating oil consequently increases, and some of the heat within the lubricating oil is transferred to the axle shaft and to the axle housing. The axle shaft and axle housing are of limited size and mass and, hence, of limited heat capacity. Therefore, their temperatures begin to approach (under the duty cycle of frequent stops characteristic of a loader) the temperature of the lubricating oil because ambient air typically does not convect heat from the axle housing as rapidly as the brake convects heat into the lubricating oil. It is therefore necessary to actively cool the lubricating oil.

One way to actively cool the lubricating oil is to add a cooling loop to an axle assembly and pump hot lubricating oil through a fan-cooled radiator. However, in extremely cold operating conditions, especially during start-up, it may be undesirable to attempt to circulate the lubricating oil to the axle assembly. Such circulation of highly viscous lubricating oil may result in the formation of "hot spots" in the axle assembly, causing degradation of axle assembly components.

It would be advantageous to provide an apparatus to selectively provide lubricating oil to the axle assembly to protect axle assembly components.

SUMMARY OF THE INVENTION

The present invention relates to a work vehicle including a frame and a first axle assembly coupled to the frame and including a first axle shaft, a second axle shaft and a first axle housing. The first and second axle shaft and a first coil are disposed substantially within the first axle housing. A first wheel is coupled to the first axle shaft and a second wheel is coupled to the second axle shaft of the first axle assembly. A second axle assembly is coupled to the frame and includes a third axle shaft, a fourth axle shaft and a second axle housing. The third and fourth axle shaft and a second coil are disposed substantially within the second axle housing. A third wheel is coupled to the third axle shaft and a fourth wheel is coupled to the fourth axle shaft of the second axle assembly. An axle lubricating fluid is disposed within the first and second axle housing, the first coil is configured to conduct cooling fluid through the first axle housing and the second coil is configured to conduct cooling fluid through the second axle housing. The first and second coils maintain the cooling fluid separate from the lubricating fluid. A cooling fluid circuit is selectively fluidly coupled to the first coil and the second coil to circulate the cooling fluid therethrough.

The present invention further relates to a work vehicle including a frame and a first axle assembly coupled to the frame and including a first axle shaft, a second axle shaft and a first axle housing. The first and second axle shaft and a first coil are disposed substantially within the first axle housing. A first wheel is coupled to the first axle shaft and a second wheel is coupled to the second axle shaft of the first axle assembly. A second axle assembly is coupled to the frame and includes a third axle shaft, a fourth axle shaft and a second axle housing. The third and fourth axle shaft and a second coil are disposed substantially within the second axle housing. A third wheel is coupled to the third axle shaft and a fourth wheel is coupled to the fourth axle shaft of the second axle assembly. An axle lubricating fluid is disposed within the first and second axle housing, the first coil is configured to conduct cooling fluid through the first axle housing and the second coil is configured to conduct cooling fluid through the second axle housing. The first and second coils maintain the cooling fluid separate from the lubricating fluid. A fixed displacement cooling fluid circuit is selectively fluidly coupled to the first coil and the second coil to circulate the cooling fluid therethrough.

An advantage of the present invention is the apparatus provides cooling to the lubricating oil of the axle brakes, making use of existing fan and pump components.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
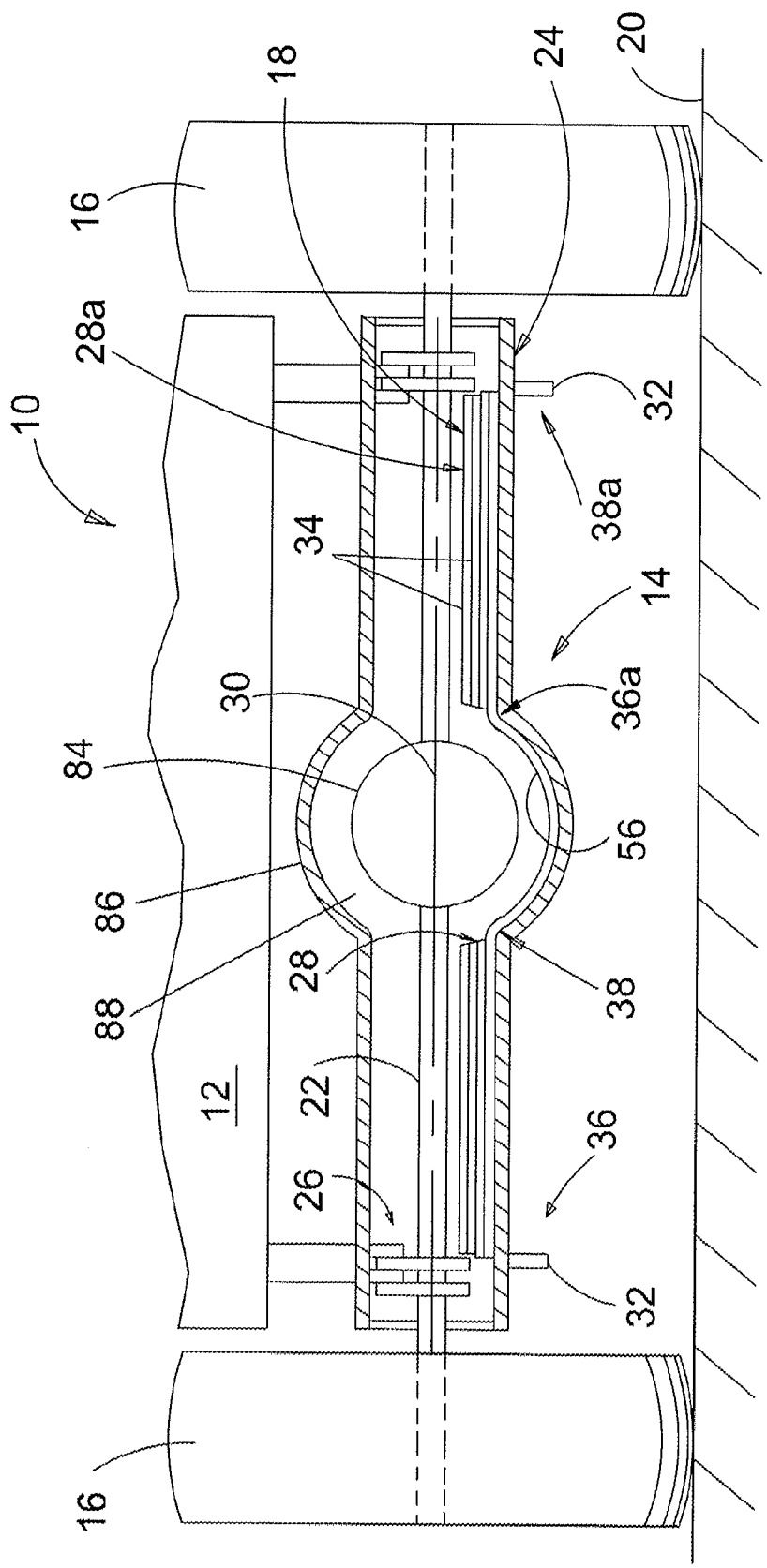
FIG. 1 is a rear sectional elevation view of an axle assembly of a work vehicle.

FIG. 1 shows a work vehicle 10 provided with a frame 12, an axle assembly 14, wheels 16, and an axle cooling apparatus 18. Frame 12 may be of any of the conventional types including fabricated steel or cast iron. Axle assembly 14 and axle cooling apparatus 18 are described below, and wheel 16 may be of any of the conventional types; e.g., rubber-tired, cleated, or tracked. Wheels 16 support axle assembly 14 with respect to a pavement or ground surface 20, and axle assembly 14 supports frame 12. Only one axle assembly 14 is shown, but work vehicle 10 may include any number of axle assemblies 14.

Axle assembly 14 includes at least one axle shaft 22 generally contained within an axle housing 24 and supported by axle housing 24 for rotative movement relative to axle housing 24. Axle shaft 22 is of conventional construction, typically machined of a medium-carbon steel and hardened at least in the regions of splines (not shown). Axle housing 24 is also generally of conventional construction (e.g., cast gray or ductile iron or fabricated of steel), but is of generally large transverse sectional size to accommodate a brake 26 and a cooling device, or coil 28 (both described below), as well as a planetary gearset (not shown). Axle housing 24 may be of any transverse sectional shape; e.g., round, square, etc.

Brake 26, shown schematically in FIG. 1, is, in an exemplary embodiment, a wet multidisk brake of well-known and conventional design. The term "wet" refers to a bath of lubricating fluid 30 that at least partially immerses brake 26, lubricating fluid 30 thereby providing both lubrication and cooling of brake 26.

A cooling device, shown as a coil 28 and a portion of axle cooling apparatus 18 (described below), is also housed within axle housing 24. Coil 28 is a tubular device having a passage 32 provided internally therethrough, is of generally conventional construction and is fabricated of a plurality of metal tubes 34, generally similar to a tube bundle of a shell-and-tube heat exchanger. In an exemplary embodiment, coil 28 is formed of a single length of tubing in one or more parallel "passes" by a series of 180 degree bends, providing a plurality of parallel tube lengths, each length connected to an adjacent length at one end so that the passes are disposed in series flow arrangement and coil 28 has one inlet port 36 and one outlet port 38. In an alternative embodiment (not shown), a coil is fabricated of a plurality of cut tube lengths joined to each other by "U"-shaped return bend fittings, themselves fabricated, if necessary, of a street elbow secured and sealed to a conventional elbow. In a further alternative embodiment, coil 28 includes fins, dimples, or is flattened to increase the surface area thereof in contact with lubricating fluid 30, and thereby to increase the heat transfer from lubricating fluid 30 to coil 28.

In yet a further embodiment, axle assembly 14 includes a second coil 28a, generally similar to first coil 28 described above. Second coil 28a is fluidly disposed in parallel flow relationship to first coil 28. Inlet port 36 of first coil 28 is in fluid communication with inlet port 36a of second coil 28a, and outlet port 38 of first coil 28 is in fluid communication with outlet port 38a of second coil 28a. This provides a large flow area, and hence a high flow rate of cooling fluid through first coil 28 and second coil 28a, allowing a high heat transfer rate with a relatively small and inexpensive first coil 28 and second coil 28a. In another embodiment, second coil 28a is fluidly disposed in series flow relationship to first coil 28 by use of a connector, shown as a crossover conduit 56. Outlet port 38 of first coil 28 delivers cooling fluid to inlet port 36a of second coil 28. This configuration provides a greater length of time for any given particle of cooling fluid to absorb heat from coils 28 and 28a at a relatively low flow rate, providing a relatively large efficiency of cooling in terms of the quantity of thermal units transferred per unit of cooling fluid volume.

Coils 28, 28a are disposed near an inner bottom surface of axle housing 24 to ensure its immersion in lubricating oil in various pitch and roll angles of work vehicle 10. In an exemplary embodiment, at least the lower portion of axle housing 24 is of a square transverse sectional shape so that coils 28, 28a may be formed of a flat sectional shape. In an alternative embodiment, the transverse sectional shape of an axle housing is generally circular and the sectional shape of a coil is that of a segment of a circle having a slightly smaller radius than that of an inner surface of the axle housing.

Figure 2:
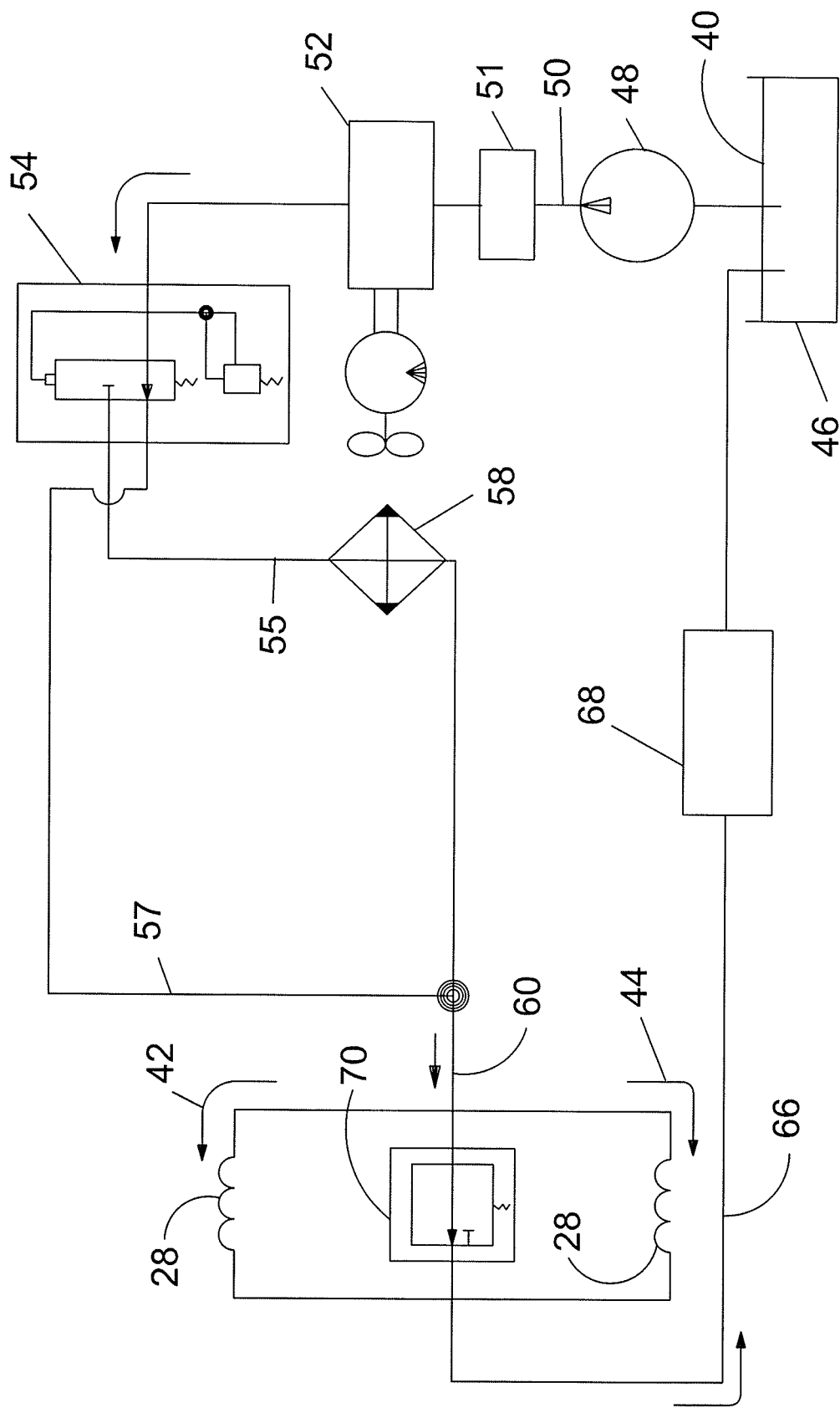
FIG. 2 is a schematic diagram of an embodiment of an axle cooling apparatus for cooling two axle assemblies.

Passage 32 within coils 28, 28a is filled with a cooling fluid 40 (circulating in cooling circuits 42, 44 in FIG. 2). If cooling fluid 40 is of a high pressure (e.g., greater than 80 pounds per square inch), coils 28, 28a are preferably fashioned of a formable steel tube material and secured to fittings by welding or brazing. If cooling fluid 40 is of a lower pressure, coils 28, 28a may advantageously be fashioned of a copper alloy (e.g., a soft brass) or an aluminum alloy for higher thermal conductivity and therefore a higher rate of heat transfer.

Cooling fluid 40 may be any of fluid, liquid or gaseous, with sufficient heat capacity and flow rate to remove braking heat from coils 28, 28a. Since, however, most examples of work vehicle 10, such as a loader, are provided with hydraulic systems which include a hydraulic fluid generally maintained much lower than 300 degrees in temperature and otherwise suitable for removing heat from coils 28, 28a, in an exemplary embodiment work vehicle 10 uses hydraulic fluid obtained from an existing work vehicle hydraulic system as cooling fluid 40.

In operation, lubricating fluid 30 receives heat from brake 26. Fluid 30 flows around coils 28, 28a. Coils 28, 28a have outer and inner surfaces. Fluid 30 has a higher temperature than the outer surface of coils 28, 28a and the outer surface of coils 28, 28a have a higher temperature than cooling fluid 40. This results in heat transfer from lubricating fluid 30 to cooling fluid 40. Heat is removed from cooling fluid 40 as described below with respect to FIG. 2. FIG. 2 is a schematic diagram of axle cooling circuit 42 for an axle cooling apparatus 18 having one coil 28 or coils 28, 28a for cooling of an axle assembly 14. FIG. 2 further shows an axle cooling circuit 44 for a second axle assembly 14. It is to be understood that more than two axle assemblies may be cooled, if desired. Cooling apparatus 18 is a portion of a much larger and more complex hydraulic power circuit. In one embodiment, cooling circuits 42, 44 receive cooling from a fluid circuit associated with driving a fan valve 52, as will be discussed in additional detail below. However, it is to be understood that fluid circuits for other systems or subsystems may also be used. In addition, components, such as a filter 68, is shown at optional locations in FIG. 2, but not further discussed.

It is to be understood that while lubricating fluid 30 may be maintained separately from cooling fluid 40, in one embodiment, lubricating fluid 30 and cooling fluid 40 may be the same fluid.

Figure 3:
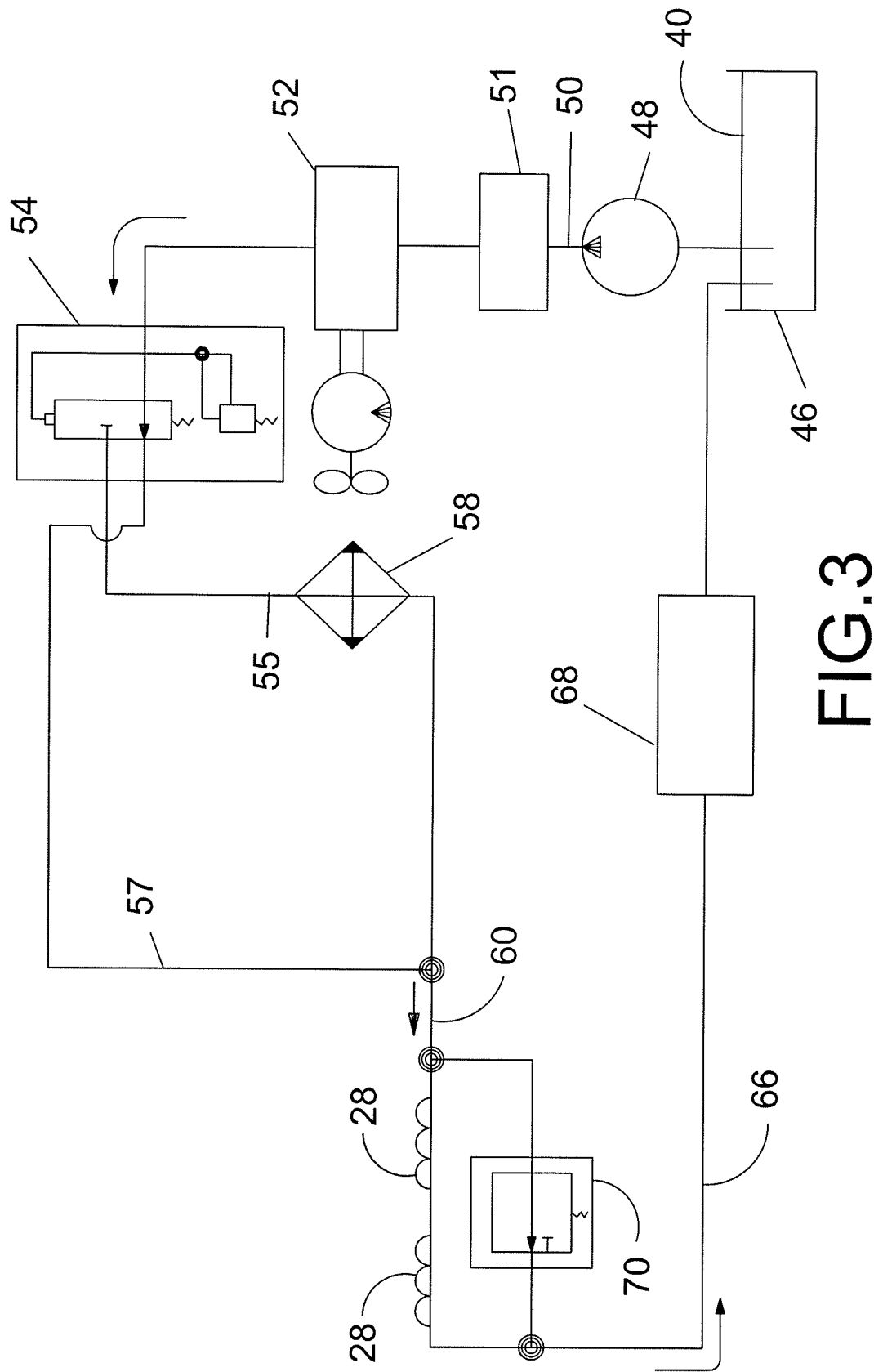
FIG. 3 is a schematic diagram of an alternate embodiment of an axle cooling apparatus for cooling two axle assemblies.
Figure 4:
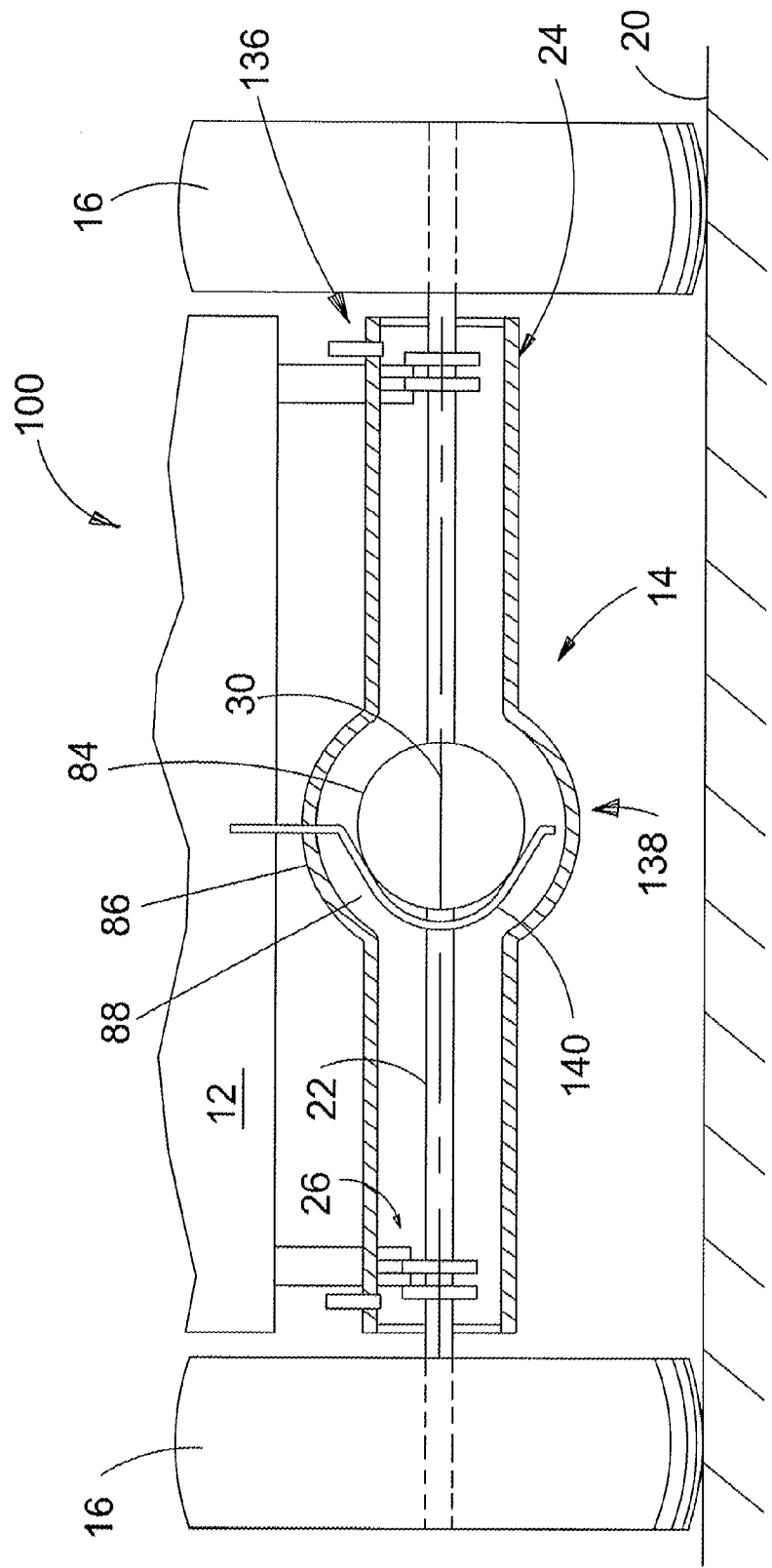
FIG. 4 is a rear sectional elevation view of an axle assembly according to an alternate embodiment of a work vehicle.

While FIG. 2 shows fluid circuits 42, 44 in a parallel flow arrangement with each other, FIG. 3 shows an alternate arrangement in which a single fluid circuit is arranged in a serial flow arrangement for multiple coils 28. It is also to be understood that similar to FIG. 2, coil 28 and coil 28a of the same axle assembly 14 can be arranged in serial or parallel flow, and that coil 28 and coil 28a of different axle assemblies can be similarly arranged for serial or parallel flow or a combination of flows thereof with multiple axle assemblies.

As further shown in FIG. 2, the fluid circuit associated with driving fan valve 52 includes a reservoir 46 for circulating cooling fluid 40 that is drawn therefrom by a pump 48. Pump 48 may include one or more pumps disposed in a desirable arrangement. Pump 48 delivers a cooling fluid 40 through line 50 to brake valve 51 and then to fan valve 52. Brake valve 51 provides the hydraulic pressure required to operate brakes 26 (FIG. 1). An optional thermal bypass valve 54 downstream of fan valve 52, when actuated, directs cooling fluid 40 through lines 57 and 60, thereby bypassing line 55 and heat exchanger 58. Bypassing heat exchanger 58 prevents undesired cooling of cooling fluid 40, such as during operation in extremely cold conditions. At line 60, flow of cooling fluid 40 may be bifurcated through cooling circuits 42, 44. In cooling circuit 42, cooling fluid 40 is directed to flow through coil 28, 28*a* and placed in thermal communication with lubricating fluid 30 (FIG. 1) in a first axle assembly 14 to cool lubricating fluid 30. In cooling circuit 44, cooling fluid 40 is directed to flow through coil 28, 28*a* and placed in thermal communication with lubricating fluid 30 (FIG. 1) in a second axle assembly 14 to cool lubricating fluid 30. Optionally, a control valve 70, such as a pressure relief valve, operates to control the amount of backpressure of the hydraulic circuit. After flowing though cooling circuits 42, 44 and/or control valve 70, cooling fluid 40 is returned through return line 66 to reservoir 46.

In an embodiment of axle assembly 14, first axle shaft 22 and a second axle shaft may be connected to opposite sides of a differential gearset 84 (shown in FIG. 1). Generally, a differential housing 86, configured to include a chamber 88 to accommodate differential gearset 84, is then provided to support and shield differential gearset 84 and to contain a lubricant for differential gearset 84. Typically, this lubricant will be similar to lubricating fluid 30, and one common bath of lubricating fluid 30 may be used for lubrication of differential gearset 84 as well as for lubrication and cooling of other parts of axle assembly 14. Crossover conduit 56 may then be given the bowed shape shown in FIG. 1 in order to not interfere with differential gearset 84.

It is to be understood that while heat exchanger 58 is shown as an air-to-oil type, other heat exchanger types may be used, including but not limited to water-to-oil or oil-to oil.

In another embodiment of work vehicle 100, which is otherwise similar to work vehicle 10, there is no coil 28, 28*a* disposed in axle housing 24 to circulate lubricating fluid 30 for purposes of heat transfer from brake 26. Instead, an inlet port 136 is disposed adjacent to brake 26, and in one embodiment, to both brakes 26. A discharge port 138 of a discharge line 140 is disposed adjacent to differential gearset 84. Instead of there being a separated lubricating fluid 30 maintained separately from cooling fluid 40 as in work vehicle 10, cooling fluid 40 and lubricating fluid 30 are mixed in axle assembly 14. In one embodiment, cooling fluid 40 enters inlet port 136 and is sprayed onto brake 26. Simultaneously, lubricating fluid 30 exits axle assembly 14 via discharge port 138 of discharge line 140, and upon exiting axle assembly 14 becomes cooling fluid 40.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A work vehicle comprising:
    a frame;
    a first axle assembly coupled to the frame and including a first axle shaft, a second axle shaft and a first axle housing, wherein the first and second axle shaft and a first coil are disposed substantially within the first axle housing;
    a first wheel coupled to the first axle shaft and a second wheel coupled to the second axle shaft of the first axle assembly;
    a second axle assembly coupled to the frame and including a third axle shaft, a fourth axle shaft and a second axle housing, wherein the third and fourth axle shaft and a second coil are disposed substantially within the second axle housing;
    a third wheel coupled to the third axle shaft and a fourth wheel coupled to the fourth axle shaft of the second axle assembly;
    an axle lubricating fluid disposed within the first and second axle housing, the first coil is configured to conduct cooling fluid through the first axle housing and the second coil is configured to conduct cooling fluid through the second axle housing, the first and second coils maintaining the cooling fluid separate from the lubricating fluid;
    a cooling fluid circuit having a pump selectively fluidly coupled to the first coil and the second coil to circulate the cooling fluid therethrough wherein flow passing from the pump will flow through at least one vehicle control component and the coils unless diverted by a pressure relief valve in parallel with at least one of the coils; and
    wherein the pressure relief valve is fluidly coupled in parallel to at least one of the first and second coil downstream from a heat exchanger.

2. A work vehicle comprising:
    a frame;
    a first axle assembly coupled to the frame and including a first axle shaft, a second axle shaft and a first axle housing, wherein the first and second axle shaft and a first coil are disposed substantially within the first axle housing;
    a first wheel coupled to the first axle shaft and a second wheel coupled to the second axle shaft of the first axle assembly;
    a second axle assembly coupled to the frame and including a third axle shaft, a fourth axle shaft and a second axle housing, wherein the third and fourth axle shaft and a second coil are disposed substantially within the second axle housing;
    a third wheel coupled to the third axle shaft and a fourth wheel coupled to the fourth axle shaft of the second axle assembly;
    an axle lubricating fluid disposed within the first and second axle housing, the first coil is configured to conduct cooling fluid through the first axle housing and the second coil is configured to conduct cooling fluid through the second axle housing, the first and second coils maintaining the cooling fluid separate from the lubricating fluid;
    a cooling fluid circuit having a pump selectively fluidly coupled to the first coil and the second coil to circulate the cooling fluid therethrough wherein flow passing from the pump will flow through at least one vehicle control component and the coils unless diverted by a pressure relief valve in parallel with at least one of the coils; and
    wherein the circuit includes the pump, a reservoir and heat exchanger oriented such that flow from the pump will travel from the pump through the heat exchanger and then through the coils before returning to the reservoir unless diverted by one of a thermal bypass valve or the pressure relief valve.

3. The work vehicle of claim 2, wherein the pressure relief valve is fluidly coupled to the first and second coil.

4. The work vehicle of claim 1, wherein the vehicle control component is a brake valve configured to provide hydraulic pressure required to operate brakes of the work vehicle.

5. The work vehicle of claim 4, wherein the cooling fluid circuit further comprises a fan downstream from the brake valve.

6. The work vehicle of claim 5, further comprising a heat exchanger associated with the fan that is selectably fluidly coupled to the cooling fluid circuit.

7. The work vehicle of claim 6, wherein a thermal bypass valve is fluidly disposed in the fluid path between the fan and the heat exchanger upstream from the coils and configured when activated to bypass flow around the heat exchanger toward the coils.

8. A work vehicle comprising:
- a frame;
- a first axle assembly coupled to the frame and including a first axle shaft, a second axle shaft and a first axle housing, wherein the first and second axle shaft and a first coil are disposed substantially within the first axle housing;
- a first wheel coupled to the first axle shaft and a second wheel coupled to the second axle shaft of the first axle assembly;
- a second axle assembly coupled to the frame and including a third axle shaft, a fourth axle shaft and a second axle housing, wherein the third and fourth axle shaft and a second coil are disposed substantially within the second axle housing;
- a third wheel coupled to the third axle shaft and a fourth wheel coupled to the fourth axle shaft of the second axle assembly;
- an axle lubricating fluid disposed within the first and second axle housing, the first coil is configured to conduct cooling fluid through the first axle housing and the second coil is configured to conduct cooling fluid through the second axle housing, the first and second coils maintaining the cooling fluid separate from the lubricating fluid; and
- a cooling fluid circuit is fluidly coupled to the first coil and the second coil to circulate the cooling fluid therethrough wherein the circuit includes a pump, reservoir and heat exchanger oriented such that flow from the pump will travel from the pump through the heater exchanger and then through coils before returning to the reservoir unless diverted by one of a thermal bypass valve or a pressure relief valve.

9. The work vehicle of claim 8, wherein the pressure relief valve is fluidly coupled in parallel with at least one of the first and second coil downstream of the heat exchanger.

10. The work vehicle of claim 8, wherein the first coil and the second coil are coupled in parallel.

11. The work vehicle of claim 10, wherein the pressure relief valve is fluidly coupled to the first and second coil.

12. The work vehicle of claim 8, wherein the cooling fluid circuit further comprises a brake valve configured to provide hydraulic pressure required to operate brakes of the work vehicle.

13. The work vehicle of claim 12, wherein the cooling fluid circuit further comprises a fan downstream from the brake valve.

14. The work vehicle of claim 13, wherein the heat exchanger is associated with the fan.

15. The work vehicle of claim 14, wherein the thermal bypass valve is fluidly disposed between the fan and the heat exchanger to selectively bypass flow around the heat exchanger toward the coils.

* * * * *